Jan. 4, 1966 M. SCHLICHTE 3,227,812
COMMUNICATION CHANNEL-JOINING FORK CIRCUIT
Filed Aug. 7, 1962
Fig.1
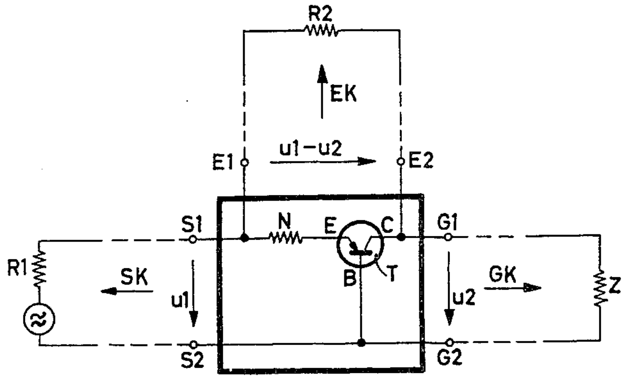
Fig.2
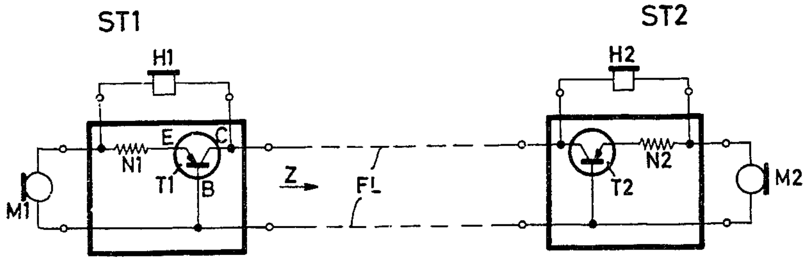
Fig.3 Fig.4
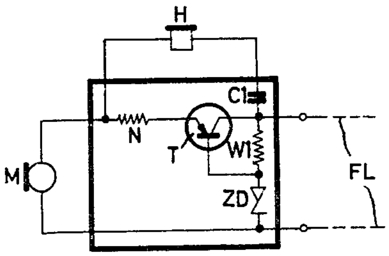
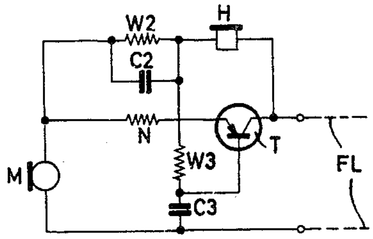

United States Patent Office 3,227,812

Patented Jan. 4, 1966

3,227,812

COMMUNICATION CHANNEL-JOINING FORK CIRCUIT

Max Schlichte, Munich, Germany, assignor to Siemens & Halske Aktiengesellschaft, Berlin and Munich, Germany, a corporation of Germany Filed Aug. 7, 1962, Ser. No. 215,443
Claims priority, application Germany, Aug. 7, 1961, S 75,209
6 Claims. (Cl. 179—81)

The invention disclosed herein is concerned with a hybrid circuit for joining, in a communication system, a sender channel and a receiver channel with a transmission channel which is common to both transmission directions, comprising means for decoupling the receiver channel with respect to the sender channel.

Hybrid circuits customarily used in the communication art are generally formed by induction coils disposed in a circuit wherein two pairs of terminals are mutually decoupled. The minimum attenuation of such hybrid circuits amounts to 0.35 neper, even when assuming that the induction coils are free of loss. Accordingly, upon connecting with such hybrid circuit, two telephone stations over a loss-free line, the voice voltages will suffer an attenuation amounting to at least 0.7 neper. However, the attenuation is in practice greater, amounting to about 0.9 to 1.2 neper, owing to losses in the hybrid repeaters.

The invention proposes a hybrid circuit for communication systems, whereby a sender channel and a receiver channel can be joined with a transmission-or repeater channel which is common to both transmission directions, with the receiver channel being decoupled with respect to the sender channel, wherein the attenuation is considerably reduced.

The characteristic features of the hybrid circuit according to the invention reside in that the terminals for the sender channel are connected with the terminals for the common transmission channel, over an amplifier element formed in the manner of a common base stage, having a resistor arranged in the emitter branch thereof, the resistance of the resistor corresponding approximately to the apparent resistance of the input of the common transmission channel, the terminal for the sender channel, which is connected with the emitter branch, and the terminal for the common transmission channel, which is connected with the collector branch, forming the terminals for the receiver channel.

It is with such a hybrid circuit possible to reduce the attenuation between electroacoustic transducers of interconnected telephone stations by about 0.7 to 1 neper. The voltage loss is with the use of such hybrid circuits only half as great as in the case of heretofore customary hybrid circuits, and the power loss amounts only to one-fourth of the loss incurred in connection with customary hybrid circuits.

Details of the invention will appear from the description which is rendered below with reference to the accompanying drawing.

FIG. 1 shows an example of the hybrid circuit according to the invention, employing a transistor as an amplifier element, bringing out the principles applied;

FIG. 2 represents the use of the invention in connection with a side tone attenuation circuit for telephone stations; and FIGS. 3 and 4 indicate examples for the feed of the amplifier element of the hybrid circuit.

The hybrid circuit according to the invention, as shown in FIG. 1, comprises the terminals S1 and S2 for the sender channel SK, the terminals E1 and E2 for the receiver channel EK, and the terminals G1 and G2 for the common transmission channel GK. The terminals for the sender channel and for the common transmission channel are connected over the amplifier element T, a transistor operated in common-base circuit, in the emitter branch of which is disposed a resistor N. The terminal S1 for the sender channel and the terminal G1 for the common transmitter channel, serve as terminals for the receiver channel.

FIG. 1 also indicates the internal resistance of the individual channels, symbolized by R1, R2 and Z, so as to aid in explaining the operation of the hybrid circuit. The voltages between the pairs of terminals are for the individual channels indicated by $\mu 1, \mu 1-\mu 2$ and $\mu 2$.

Upon assuming ideal properties for the amplifier element T of the hybrid circuit, the input voltage $\mu 1$ will be equal to the output voltage $\mu 2$, provided that the value of the resistance N does not differ from that of the resistance Z. Accordingly, $$\mu 1=\mu 2 \qquad (1)$$

when $$N=Z \qquad (2)$$

In such situation, a load connected between the input and output, that is, a resistance R2 connected to the terminals E1 and E2 of the receiver channel, will not receive any voltage. The emitter resistor N has the function of a line substitution.

The resistance values R1 and R2 are for the bridge equalization immaterial; however, as will be presently shown, they determine the power- and the line-matching of the hybrid circuit.

The equalization requirement 2 for ideal transistor properties calls for a correction when using a transistor with the steepness S and current amplification. The equalization condition is in such case:

$$N \approx \alpha \cdot Z - 1/S. \qquad (2a)$$

However, the value for the emitter resistance N deviates here likewise only by a few percent from the resistance value Z of the common transmission channel.

The equalization requirements for a decoupling of the receiver channel with respect to the sender channel, corresponding respectively to the Equations 2 and 2a, merely give a rule for the magnitude of the emitter resistance N. This rule is complied with for desired resistances R1 of the sender channel and for desired resistances of the receiver channel, provided that the emitter resistance N is of the required magnitude. It is, however, advantageous to avoid freely selecting the internal resistances of the sender and receiver channels. It should be considered in this connection that a lower attenuation is, as compared with customary hybrid circuits, not achieved for desired values of these resistances. The resistances of the sender and receiver channels must be dimensioned depending upon the use of the hybrid circuit.

The embodiment shown in FIG. 2 serves as an example for a dimensioning rule. It is in this example assumed that two telephone stations ST1 and ST2, each of which is provided with a side tone attenuation circuit containing the hybrid circuit according to the invention, are connected over a loss free telephone line FL. It is in connection with such circuits desired that as much as possible of the voice energy of the microphone reaches the receiver of the communicating station upon decoupling of the receiver H and the microphone M. This leads to rules for dimensioning the resistance values of the sender and receiver channel, in the present case, rules for dimensioning respectively the resistance values of the microphones and the receivers of the subscriber stations.

The voice energy transmitted from the microphone of a station to the receiver of the communicating station reaches a maximum, first, when the common transmission channel is connected free of reflection to the hybrid circuit, that is, when the internal resistance of the hybrid circuit is matched to the wave impedance Z of the common transmission channel, and second, when as great as possible a part of the power supplied by the microphone reaches over the reflection-free transmission line the receiver of the communicating station. Opon designating the internal resistance of the hybrid circuit by R$i$ and the power given off by the microphone by L, and designating all values referring to the wave impedance Z of the common transmission channel, by primed reference symbols, there will be obtained, based upon the two above named requirements, the following dimensioning rules respectively for the resistances R1 and R2 of the sender and receiver channels. The internal resistance of the hybrid circuit is $$\frac{Ri}{Z}=R1'+R2'(1+R1') \qquad (3)$$

Upon power matching according to the first noted requirement, $$\frac{Ri}{Z}=1 \qquad (4)$$

there will result between the resistance R1 of the sender channel and the resistance R2 of the receiver channel, the following relation, namely $$R2'=1-\frac{2R1'}{1+R1'} \qquad (5)$$

The voice power given off from the sender channel to the common channel amounts to $$L'=\frac{4R1'}{(1+R1')^2} \qquad (6)$$

The receiver channel of the communicating station receives therefrom the part $$\frac{LE}{L'}=1-R'^2 \qquad (7)$$

There results from the Equations 6 and 7, for the attenuation of the voice current connection $$a=\frac{1}{2}\ln\frac{L}{LE}=\frac{1}{2}\ln\frac{1}{4R1'}\cdot\frac{R1'+1}{R1'-1} \qquad (8)$$

which becomes a minimum for $$R1'=\sqrt{2}-1=0.414 \qquad (9)$$

The Equation 9 introduced in the Equation 6 results in $$R2'=R1'=0.414 \qquad (10)$$

At a wave impedance $Z=600$ ohms, there will therefore be obtained as resistances for the sender and receiver channels $$R1=R2=248\text{ ohms} \qquad (11)$$

With such resistances, the voice current connection will have an attenuation of $$a=\ln\frac{1}{2R1'}=0.18\text{ neper}$$

The attenuation minimum obtained has a very flat course. Small deviations of resistance values of the sender or receiver channels, from the operatively desired value, do not result in any considerable attenuation changes. The hybrid circuit is therefore particularly well adapted for side-tone attenuation circuits in telephone stations which are equipped with the customary electroacoustic transducers. The resistance R1 of the sender channel in connection with such stations amounts to approximately 200 ohms and the resistance R2 of the receiver channel approximately to 300 ohms.

FIG. 3, just like FIG 2, shows the use of the new hybrid circuit in connection with a side-tone attenuation circuit for telephone stations. To the terminals for the sender channel is connected the microphone M and to the terminals for the receiver channel is connected the receiver H, while the line FL is connected to the terminals for the common transmission channel. Supplementing FIG. 2, FIG. 3 shows means for feeding the transistor T which is used as an amplifier element. It shall be assumed that the feed voltage is extended from a central battery over the line FL. The direct current voltage for the base of the transistor can in such case be obtained from a voltage divider comprising the resistor W1 and the Zener diode ZD. The Zener diode offers a negligibly low resistance for the voice voltages.

The circuit according to FIG. 3 is particularly adapted for low loop current such as are encountered in electronic communication systems.

The circuit shown in FIG. 4, in which the feed for the transistor T, serving as an amplifier element, is also indicated, permits utilization of a greater loop current, and is adapted for use in customary communication systems. A part of the loop current is here conducted directly over the electroacoustic transducers. The base voltage is by means of a high resistance resistor W3 tapped from a voltage divider comprising the resistances of the microphone and the receiver and a further resistor W2.

Changes may be made within the scope and spirit of the appended claims which define what is believed to be new and desired to have protected by Letters Patent.

I claim:

1. A hybrid circuit for joining in a communication system a sender channel and a receiver channel with a transmission channel which is common to both directions of transmission, with the receiver channel being decoupled with respect to the sender channel, comprising terminals for the sender channel, terminals for the common transmission channel, a transistor arranged for operation in the manner of a common base stage, circuit means for connecting over said transistor the terminals for the sender channel with the terminals for the common transmission channel, a resistor disposed in the emitter branch of said transistor, the resistance of said resistor corresponding approximately to the apparent resistance of the input of the common transmission channel, one of the terminals for the sender channel, which is connected with the emitter branch of said transistor, and one of the terminals for the common transmission channel, which is connected with the collector branch thereof, forming the terminals for the receiver channel.

2. A hybrid circuit according to claim 1, wherein the resistance value of the internal resistance of the sender channel and the input resistance of the receiver channel, referred to the wave impedance of the common transmission channel, amounts to about $\sqrt{2}-1=0.414$.

3. A hybrid circuit according to claim 2, wherein the feeding of the transistor is effected from a central feed voltage source over the common transmission channel.

4. A hybrid circuit according to claim 3, comprising circuit means, disposed between the conductors of the common transmission channel, forming a voltage divider for supplying direct current potential for the collector and base electrodes of the transistor.

5. A hybrid circuit according to claim 4, comprising a Zener diode forming a resistor included in said voltage divider.

6. A hybrid circuit according to claim 4, employed for side tone attenuation in telephone apparatus, wherein the means forming said voltage divider comprises the direct current resistances of the microphone and receiver and an ohmic resistor.

References Cited by the Examiner

UNITED STATES PATENTS

| | | | |
|---|---|---|---|
| 2,499,423 | 3/1950 | Selinger | 179—170 |
| 2,762,867 | 9/1956 | Meacham | 179—81 |
| 2,818,470 | 12/1957 | Busala et al. | 179—81 |
| 2,831,067 | 4/1958 | Bryant | 179—81 |
| 2,945,920 | 7/1960 | Vlasak | 179—170 |

ROBERT H. ROSE, *Primary Examiner.*

WALTER L. LYNDE, *Examiner.*